No. 720,877. PATENTED FEB. 17, 1903.
E. BLOCH.
TRANSPARENT MIRROR.
APPLICATION FILED SEPT. 26, 1902.
NO MODEL.
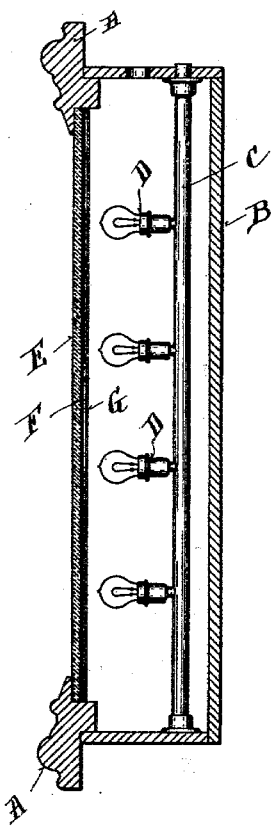
Witnesses
Oliver B. Kaiser
Ida J. Lucas
Inventor
Emil Bloch
By Wood & Wood
Attorneys

UNITED STATES PATENT OFFICE.

EMIL BLOCH, OF CINCINNATI, OHIO.

TRANSPARENT MIRROR.

SPECIFICATION forming part of Letters Patent No. 720,877, dated February 17, 1903.

Application filed September 26, 1902. Serial No. 124,381. (No model.)

*To all whom it may concern:*

Be it known that I, EMIL BLOCH, a subject of the Emperor of Russia, residing at Cincinnati, in the county of Hamilton and State of Ohio, have invented certain new and useful Improvements in a Combined Looking and Display Glass, of which the following is a specification.

My invention relates to an advertising display device, the features of which are more fully set forth in the description of the accompanying drawing, forming a part of this specification, in which the figure represents a central vertical section of my improvement.

A represents the frame; B, the backing-box; C, a reflector forming a support for the electric lights D.

E represents a glass provided with a backing F, and G represents a poster or advertising plat, photograph, or work of art interposed between the glass and light. The backing F is formed of a composition of matter, but without any silver, which when applied to the back of the glass renders the glass opaque on its face under ordinary light conditions, but transparent when a strong light is flashed in the rear. Suitable mechanism is provided for alternately operating the electric light. When these lights are on the poster, it is shown in full outline and color and highly illumined. When the lights are off, the glass to all appearance is an ordinary mirror. I am aware that this result has been previously attempted by the use of the ordinary silver backing mixed with some kind of transparent substance; but this backing is objectionable on account of its great expense and the difficulty of using the silver of sufficiently thin coating to render the glass both opaque and transparent; also, the silver is easily destroyed and is of very short life when used for an advertising display device, which is always more or less exposed and very frequently used as an outdoor sign.

The object of my invention is to produce a backing which will be cheap and durable and which will render the glass highly opaque to all ordinary light-rays directed onto the face of the glass and clearly transparent when the artificial lights are operated in the rear.

This backing consists in a mixture of the chemical commonly known as "Rochelle salts" with muriate of tin. These chemicals are dissolved (preferably in alcohol) and mixed together in proportion varying with the size of the glass and the use demanded of it; but in general the proportions are from two-thirds to one-half Rochelle salts to one-third or one-half of the muriate of tin. The mixed solution is heated in any suitable manner, so as to be readily adhesive, and is then applied in a thin coating to the back of the glass. I have found that by adding a small quantity of potassium cyanid to the mixture the backing is improved in brilliancy. I use a very small quantity of the cyanid, generally not to exceed one-fourth part of the mixture. The different glasses differ so materially in tensile strength, fragility, and general physical characteristics that it is impossible to give an exact and invariable rule of relative proportions; but with the general figures I have given a skilled chemist will readily determine from a few trials what are the proper relative proportions of the constituents of the mixture to be used for a particular purpose and with a particular glass. After this a thin coating is applied to the glass while hot, when it is allowed to cool, and it is preferably protected by applying a second coating of shellac dissolved in alcohol. The second coating thoroughly protects the first coating. This backing is very lustrous and very durable. It adheres readily and permanently to the glass, and a coating as thin as it is possible to apply will be found to answer all the requirements.

Having described my invention, what I claim is—

A changeable mirror and transparent glass formed of a plate of glass having a thin coating of Rochelle salts and muriate of tin applied in liquid form to the back thereof, substantially as described.

In testimony whereof I have hereunto set my hand.

EMIL BLOCH.

Witnesses:
OLIVER B. KAISER,
IDA J. LUCAS.